United States Patent
Covic et al.

(10) Patent No.: US 12,355,096 B2
(45) Date of Patent: Jul. 8, 2025

(54) POSITIONING UNIT FOR SLOT NUTS

(71) Applicant: WEBASTO SE, Stockdorf (DE)

(72) Inventors: Sara Covic, Stockdorf (DE); Hans-Joachim Bammann, Stockdorf (DE); Jochen Haussmann, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 615 days.

(21) Appl. No.: 17/774,290

(22) PCT Filed: Dec. 3, 2019

(86) PCT No.: PCT/EP2019/083457
§ 371 (c)(1),
(2) Date: May 4, 2022

(87) PCT Pub. No.: WO2021/110245
PCT Pub. Date: Jun. 10, 2021

(65) Prior Publication Data
US 2022/0389945 A1    Dec. 8, 2022

(51) Int. Cl.
*F16B 2/00* (2006.01)
*H01M 50/264* (2021.01)

(52) U.S. Cl.
CPC ...... *H01M 50/264* (2021.01); *H01M 2220/20* (2013.01)

(58) Field of Classification Search
CPC .............. H01M 50/102; H01M 50/207; H01M 50/233; H01M 50/262; H01M 2220/20
See application file for complete search history.

(56) References Cited

U.S. PATENT DOCUMENTS

2017/0029034 A1    2/2017    Omar
2018/0076430 A1*   3/2018    Subramanian .......... B60L 50/64

FOREIGN PATENT DOCUMENTS

| CN | 207558872 | 6/2018 |
| DE | 102007032252 | 1/2009 |
| DE | 102015117995 | 5/2016 |
| EP | 2256433 | 12/2010 |

OTHER PUBLICATIONS

EP2256433 English translation. Esken. Europe. Dec. 1, 2010. (Year: 2010).*
DE102007032252 English translation. Haensler. Germany. Jan. 15, 2009. (Year: 2009).*
PCT Application No. PCT/EP2019/083457—International Search Report and Written Opinion dtd Aug. 18, 2020; 8 pages.

* cited by examiner

*Primary Examiner* — Christopher P Domone
(74) *Attorney, Agent, or Firm* — Haynes and Boone, LLP

(57) ABSTRACT

A fixing system for fixing battery components in a battery housing, the fixing system including a positioning unit and one or more slot nuts, wherein the positioning unit is configured to receive the one or more slot nuts at predetermined positions along the positioning unit and wherein the positioning unit including the one or more slot nuts is configured to be insertable into a slot profile.

19 Claims, 8 Drawing Sheets

POSITIONING UNIT FOR SLOT NUTS

CROSS REFERENCE TO RELATED APPLICATIONS

This application is a national stage of International Application No. PCT/EP2019/083457 filed Dec. 3, 2019, the disclosure of which is incorporated herein by reference in its entirety.

BACKGROUND

Technical Field

The invention relates to a system for securing constructional elements together, especially mechanical fasteners for fixing battery modules into a battery housing of a traction battery for a vehicle.

Related Art

The use of slot nuts as fasteners for fastening components to a slot profile, wherein a T-shaped nut is slidably inserted into the slot profile and fixed at a desired position along the slot profile, is well known in the field of mechanical fasteners. Other types of slot nuts may be rolled into or pressed into a slot of the corresponding slot profile.

Slot nuts are known in different shapes which have to be complementary to the corresponding shape of the slot profile. Once a slot nut is fastened with a bolt, it is fixed at one position along the slot profile. However, slot nuts can also be equipped with additional fixing means, e.g. a set screw, a flex handle, a ball spring or a spring leaf, which fix the slot nut at some desired position along the slot profile even before the slot nut is screwed by a bolt.

Usually more than one of such slot nuts have to be placed along the slot profile, meaning that the slot nuts have to be one by one inserted into the slot profile and positioned at the right distances from each other corresponding to the component to be fitted. This is cumbersome and time-consuming, since positioning of each slot nut has to be done separately during assembly.

Slot nuts may also be used for the assembly of a traction battery, whereby different battery components may be attached to the battery housing. It is especially advantageous to fix a battery module onto a battery housing bottom plate, which is made in the form of an extruded aluminum profile, by using slot nuts.

DE102007032252A1 discloses a battery housing with slot profiles, which enable mounting of battery components into the battery housing as well as battery housing to the vehicle frame by using slot nuts.

CN207558872 discloses a battery pack, wherein battery module housings are attached to each other by using slot nuts.

SUMMARY

An improved system for positioning slot nuts in a slot profile is described herein according to various embodiments.

Accordingly, a fixing system for fixing battery components in a battery housing is suggested. The fixing system comprises a positioning unit and one or more slot nuts, wherein the positioning unit is configured to receive the one or more slot nuts at predetermined positions along the positioning unit and wherein the positioning unit including the one or more slot nuts is configured to be insertable into a slot profile.

Using the positioning unit enables a pre-mounting of the slot nuts at predetermined positions and at desired distances from each other, which reduces the assembly time for positioning the slot nuts. By inserting the positioning unit into the slot profile and by its absolute positioning, all slot nuts inserted in the positioning unit are positioned at the desired positions at the same time. This leads to reduction of assembly time and an increase in precision in placing the slot nuts.

In some embodiments, the fixing system is arranged for mounting battery components in a battery housing, wherein the fixing system is inserted into a slot profile which may be an integral part of the battery housing. The slot profile may be provided in a base plate of the battery housing. In this case the slot profile may have the form of a channel and by using the fixing system the positioning of all slot nuts for the respective slot profile can be carried out at one go.

Furthermore, the milling work which was necessary in conventional arrangements for providing an opening to insert the slot nut can be avoided such that the integrity of the battery housing and in particular its base plate can be improved as milling is reduced.

In some embodiments, at least one slot nut is configured for mounting battery components in the battery housing, such as wherein at least one slot nut comprises at least one threaded hole for receiving a screw or bolt. In other words, the slot nut is arranged for receiving the respective fastening means for fastening the battery component to the slot nut, wherein the slot nut is situated in the slot profile of the battery housing, in particular in the base plate.

In several embodiments, the positioning unit is configured to fixate at least one slot nut at a predetermined position along the length of the positioning unit at least with respect to a first movement direction, wherein the positioning unit in various embodiments has one or more slots for fixing a slot nut at a predefined position along the length of the positioning unit. By fixating the slot nut at a predetermined position along the length of the positioning unit it is possible to move the slot nut together with the positioning unit into its predetermined position inside of the slot profile by moving the positioning unit including the slot nut into the slot profile.

As the slot nut is fixated within the positioning unit at least in one movement direction, i.e. the direction in which the positioning unit is inserted into the slot profile, the slot nut stays in its position relative to the positioning unit. Accordingly, the slot nut can be moved together with the positioning unit such that the slot nut ends up in the desired position within the slot profile by simply pushing the positioning unit into the slot profile.

In one embodiment the positioning unit has a flexible tongue attached at each slot, in order to fix each slot nut at the corresponding slot.

In certain embodiments, the positioning unit is provided in form of an extruded profile. This enables a simple manufacture of the positioning unit to correspond to the shapes of the slot profile and the slot nuts.

In one or more embodiments, the positioning unit is made of plastic, for example extruded plastic. As the positioning unit has no other purpose than to correctly position the slot nuts in the slot profile and does not have to support any forces of the fastening process, it may be provided by means of a cheap and easy to process material. Furthermore, the process of sliding the positioning unit into the slot profile can be supported by using a plastic material which glides in the (metallic) slot profile.

In some embodiments, the slot nuts are slide-in slot nuts or roll-in slot nuts such that a suitable choice of slot nuts can be made according to the respective application scenario.

In one embodiment, the slot nuts are shaped as a hexagonal prism so that the slot nuts are the widest in the middle and wherein the slot nuts have grooves along two opposite sites, for example the grooves running along the widest part of the slot nuts. By this shape, the slot nuts may mainly follow the form of a complimentary slot profile but at the same time receive portions of the positioning unit in the grooves such that the slot nuts can not only be moved along the positioning unit in a desired orientation but can also be held in a predetermined position if the flanges of the positioning unit are pressed inwardly.

In one embodiment, the positioning unit has two flanges along its length and the slot nuts are slidably insertable in the positioning unit such that the flanges of the positioning unit run in the grooves of the slot nuts.

In another embodiment, the flanges of the positioning unit exhibit gaps at predetermined positions along the positioning unit, to enable the slot nuts to be pressed in into the positioning unit. Between the gaps an elastic portion of the flange is defined.

The position of the gaps along the positioning unit and the position of the threaded hole of the slot nut along the positioning unit are in various embodiments correlated. The width of the elastic portion of the flange between the gaps is in certain embodiments aligned with the length of the slot nut.

Cutting out gaps into the flanges of the positioning unit makes pressing in the slot nuts easier, since the flange need not to be bent down along its whole length in order to insert the slot nut by pressing it in.

In several embodiments, the slot nuts have a fixing means, by which they are fixedly positioned in the positioning unit, the fixing means being one of a set screw, a flex handle, a ball spring or a spring leaf.

In various embodiments, the additional fixing means are arranged in at least one of the grooves of the slot nuts in order to fix the slot nuts in lateral direction. Such fixing means arranged in a groove of a slot nut may be a spring leaf or a ball spring, which in one or more embodiments engage with the gaps in the flanges of the positioning unit once the slot nut is fully inserted into the positioning unit.

A method for positioning of the slot nuts by using the fixing system comprises the following steps: providing a positioning unit comprising a flange on each side wall, punching out the slots at desired positions along the bottom plate, cutting out a gaps in the flanges on both side walls corresponding to the positions of the slots, and pressing the slot nuts into the positioning unit such that the positions of a threaded holes correlate with the positions of the corresponding slots and/or gaps.

BRIEF DESCRIPTION OF THE FIGURES

The present disclosure will be more readily appreciated by reference to the following detailed description when being considered in connection with the accompanying drawings in which.

DETAILED DESCRIPTION

Figure 1:
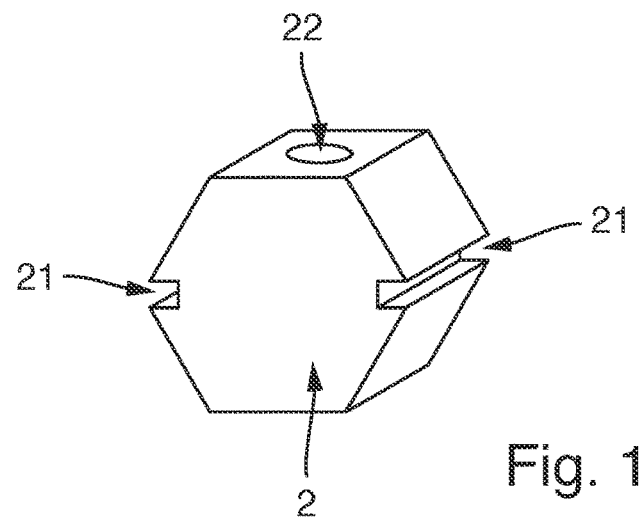
FIG. 1 shows a schematic perspective view of an embodiment of a slot nut.

In the following, the invention will be explained in more detail with reference to the accompanying figures. In the Figures, like elements are denoted by identical reference numerals and repeated description thereof may be omitted in order to avoid redundancies.

FIG. 1 shows a schematic view of a slot nut 2. The slot nut 2, also known as a T-nut or T-slot nut, is a type of a nut that is insertable into a slot profile 3 (schematically shown e.g. in FIG. 3) which has an inner shape which is basically complementary to the slot nut 2 such that the slot nut 2 is fixed in a direction perpendicular to the extension of the slot profile 3. In other words, the slot nut 2, once inserted into the slot profile 3, may carry loads in a direction perpendicular to the slot profile 3 such that it may be used to fixate components to the slot profile 3 in a direction perpendicular to the slot profile 3. This may be effected by using a bolt or screw inserted into a corresponding bore in the slot nut 2.

However, the dimensions of the slot nut 2 relative to the slot profile 3 is such that once the slot nut 2 is inserted into the slot profile 3, it may move along the slot profile 3. In other words, even though the shape of the slot nut 2 is basically complementary to the slot profile 3, the actual dimensions are smaller.

There may exist different additional fixing means to fix the slot nut 2 along the slot profile 3 even before it is used to fixate components to the slot profile 3 as will be described in detail with respect to FIGS. 10a and 10b. Slot nuts 2 may be slidably insertable into the slot profile 3 or rolled into the corresponding slot profile 3. Many different shapes of slot nuts 2 as well as slot profiles 3 are known in the art.

The slot nut 2 according to FIG. 1 has a form of a hexagonal prism so that the slot nut 2 has its widest extension in the middle of the body. The slot nut 2 has grooves 21 along each of two opposite sites. In certain embodiments, the grooves 21 run along the widest parts of the slot nut 2. The grooves 21 serve as a guideway for flanges 12 of a positioning unit 1 which will be described below with respect to FIG. 2.

The slot nut 2 has a threaded hole 22 for a bolt to be screwed into, however the slot nut 2 may generally comprise more than one threaded hole 22—depending on the intended function of the slot nut 2.

In FIG. 1, the bolt is to be attached from the upper side of the slot nut 2. In such an embodiment, it is desirable for the threaded hole 22 to have a conical shape at the top such that its diameter is slightly greater towards the upper side of the slot nut 2, which helps to compensate for small inaccuracies in positioning of the slot nut 2 along the slot profile 3. In other words, a bolt or screw which is intended to be screwed into the threaded hole 22 of the slot nut 2 may deviate slightly from the ideal position and will be guided by the conical shape of the upper side of the slot nut 2 into the intended fixing position. This will facilitate mounting fixing of components to the slot nut 2.

Figure 2:
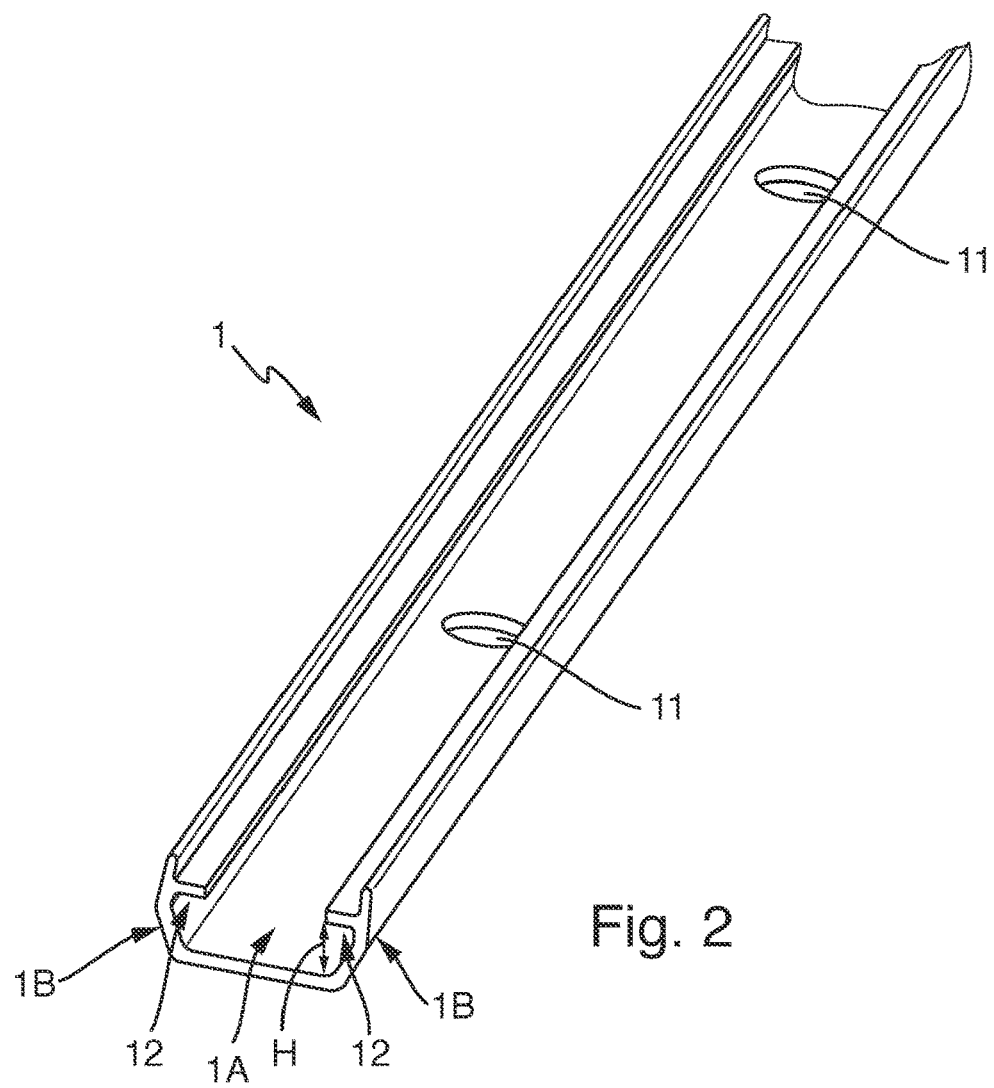
FIG. 2 shows a schematic perspective view of a positioning unit according to a first embodiment.

FIG. 2 shows a schematic view of a positioning unit 1 according to the first embodiment of the present disclosure.

According to the state of the art, the slot nuts 2 need to be inserted one by one into the slot profile 3 and each of them need to be individually positioned at desired positions along the slot profile 3.

According to the present disclosure, the positioning unit 1 as depicted in FIG. 2 provides a prepositioning of the slot nuts 2 which are then inserted into the slot profile 3 together with the positioning unit 1. By using the positioning unit 1, one or more than one slot nuts 2 can be prepositioned already outside of the slot profile 3. By inserting the positioning unit 1 including the slot nuts 2 the or all of the slot nuts 2 can be positioned at once in the slot profile 3. Thereby the assembly time can be reduced and the precision of the positioning of the slot nuts 2 within the slot profile 3 can be improved.

In the first embodiment shown in FIG. 2, the positioning unit 1 is formed as a basically U-shaped profile comprising a bottom plate 1A and two side walls 1B. Along each side wall, a flange 12 running along the length of the positioning unit 1 is positioned approximately parallel to the bottom plate and at the distance H from the bottom plate, facing inward of the positioning unit 1. The height H of the flanges from the bottom plate corresponds to positions of the grooves 21 of the slot nuts 2 as will be immediately apparent with respect to FIG. 3.

The positioning unit 1 has one or multiple slots 11 positioned at predetermined distances along the positioning unit 1. These slots 11 enable fixation of slot nuts 2 at desired positions along the length of the positioning unit 1. Different possibilities for fixation of the slot nuts 2 into the corresponding slots 11 will be discussed with respect to FIGS. 10a and 10b.

The positioning unit 1 thus exclusively serves as a prepositioning means for the slot nuts 2 during the assembly phase and in particular while inserting the slot nuts 2 into the slot profile 3. Once the positioning unit 1 together with slot nuts 1 is inserted into the slot profile 3 and any components are fixed using the slot nuts 2, the positioning unit 1 does not serve any purpose anymore and does in particular not influence the fixing of the components in any respect. Hence the positioning unit 1 does not need to be made of a very strong material, thin plastic may suffice. In some embodiments, it is made as an extruded plastic profile.

Figure 3:
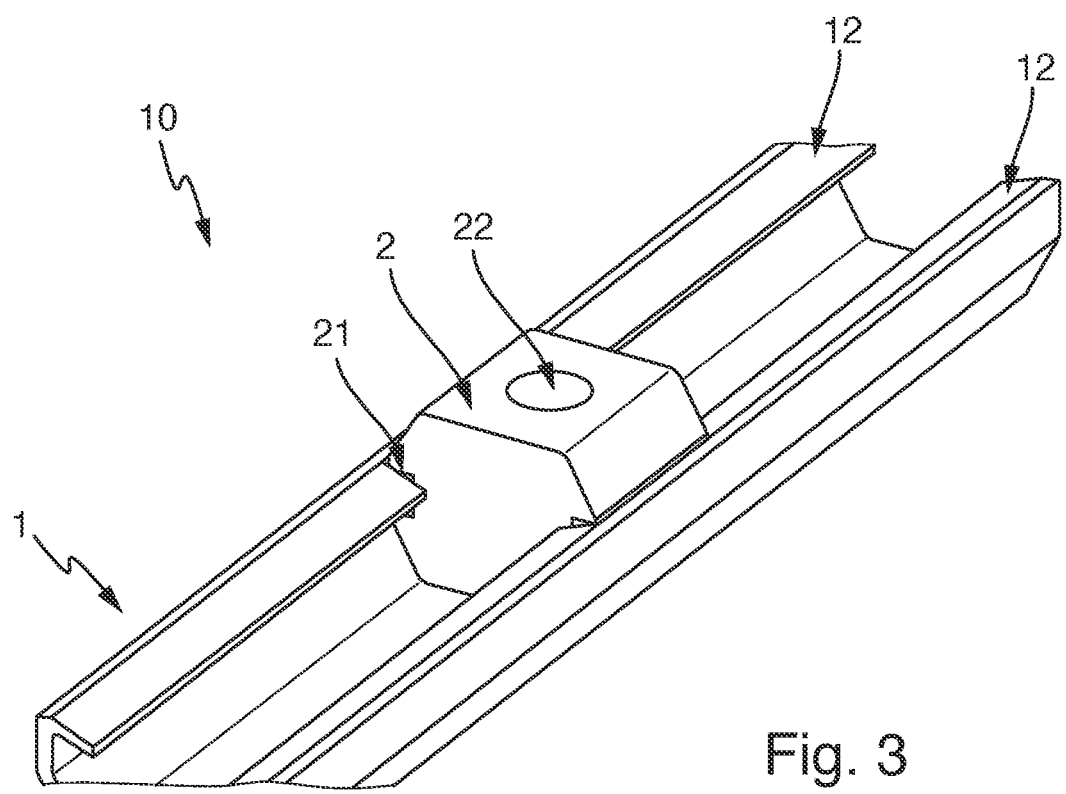
FIG. 3 shows a schematic view of a fixing system, comprising a positioning unit and a slot nut according to the first embodiment.

FIG. 3 schematically shows a fixing system 10, comprising a positioning unit 1 and a slot nut 2 which is positioned at a predetermined position in the positioning unit 1. Of course, more than one slot nut 2 may be positioned along the positioning unit 1 to form a fixing system 10. According to the first embodiment, the slot nuts 2 are slidably insertable into the positioning unit 1 such that the flanges of the positioning unit 12 run through the grooves 21 of the slot nuts 2.

Figure 4:
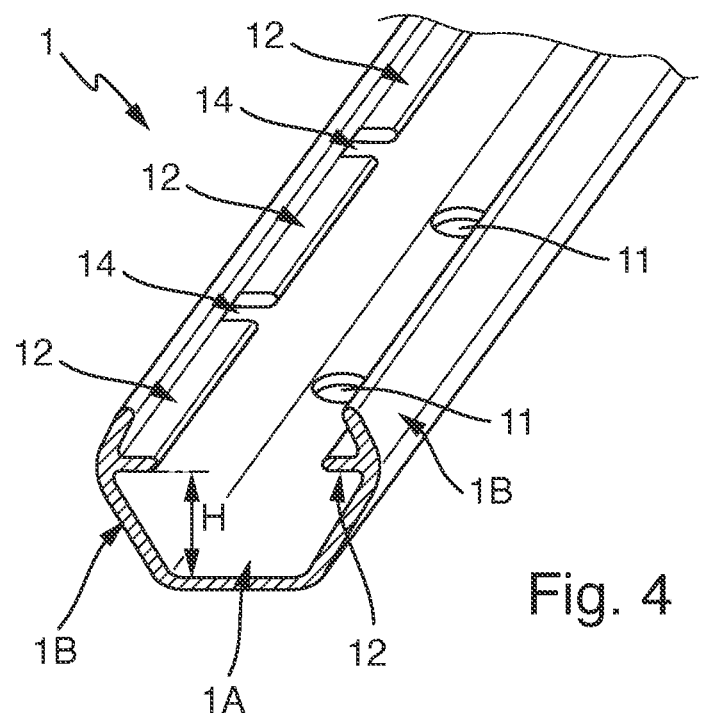
FIG. 4 shows a schematic perspective view of a positioning unit according to a second embodiment.

FIG. 4 schematically shows a positioning unit 1 according to the second embodiment. The positioning unit 1 according to the second embodiment is in one or more embodiments made of plastic. The positioning unit 1 is U-formed and has a flange 12 along each side wall 1B. The flanges 12 are placed at distance H from the bottom plate 1A and below the top edge of the side wall 1B. At predetermined positions along the positioning unit, one or multiple slots 11 are placed along the bottom plate 1A to enable fixation of the slot nuts 2 in the longitudinal direction along the positioning unit 1. The slots 11 may be punched out of the extruded positioning unit 1 in a pre-assembly process.

Similarly, the flanges 12 on both side walls 1B may be cut off at positions along the positioning unit 1, which correspond to the positions of the slots 11, such that the flanges exhibit gaps 14. Between two gaps 14 an elastic portion or tongue of the flange 12 is provided.

The length of the flange 12 between two gaps 14 should be aligned with the length of the slot nut along the positioning unit 1. This enables the elastic portion of the flange 12 to be bendable when a force is applied from above. In other words, between two gaps 14 an elastic portion of the flange 12 is provided into which the slot nut 2 can be pressed in.

Hence the slot nuts 2 may be pressed in into the positioning unit 1 at the desired positions, marked by the positions of the slots 11. The pressing in of the slot nut 2 takes place in a direction basically perpendicular to the longitudinal extension of the positioning unit 1. This may take place at the elastic portions provided in the flanges 12 by means of the gaps 14.

Figure 5:
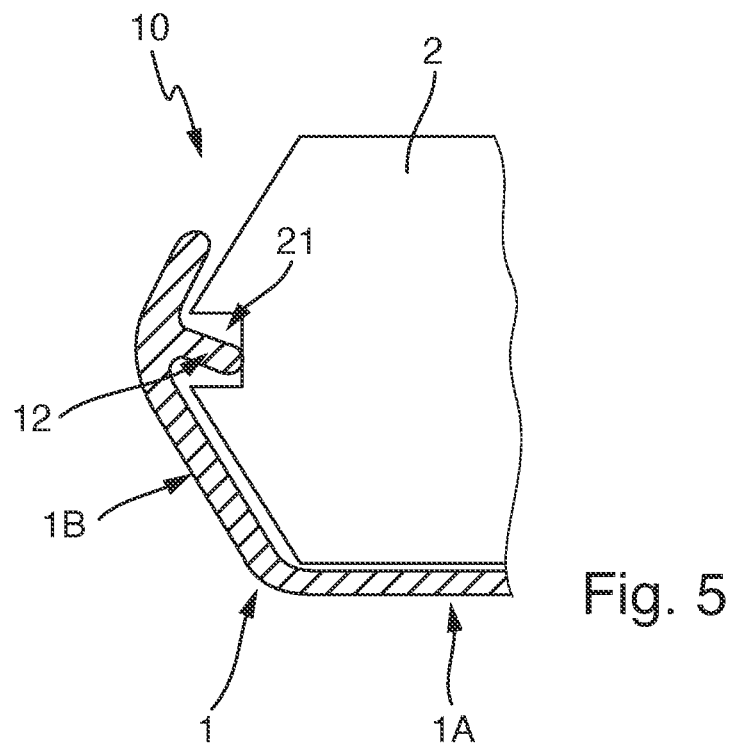
FIG. 5 shows a cross section close-up view of a fixing system according to the second embodiment.

By pressing the slot nut 2 into the positioning unit 1 at the positions of the gaps 14, the two parts of flanges 12 on each side of the gap 14 bend down and get arrested in the groove 21 of the slot nut 2 once slot nut 2 is completely inserted as depicted in the FIG. 5.

FIG. 5 shows a cross section close-up view of a fixing system according to the second embodiment. Shown is one half of the positioning unit 1 with a slot nut 2 being pressed in into its final position. The flange 12 is at first pressed down by the slot nut 2 when inserting the slot nut 2 from above and slides into the groove 21 as soon as the slot nut 2 reaches its final position in the positioning unit 1. Thereby the slot nut 2 is vertically locked into the position within the positioning unit 1.

Figure 6A:
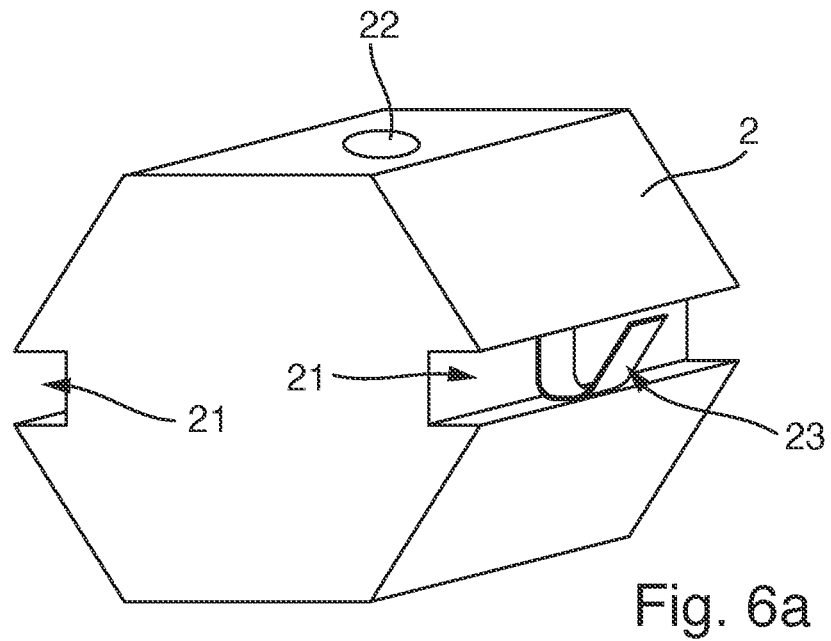
FIG. 6a shows a schematic perspective view of a slot nut with a spring leaf.
Figure 6B:
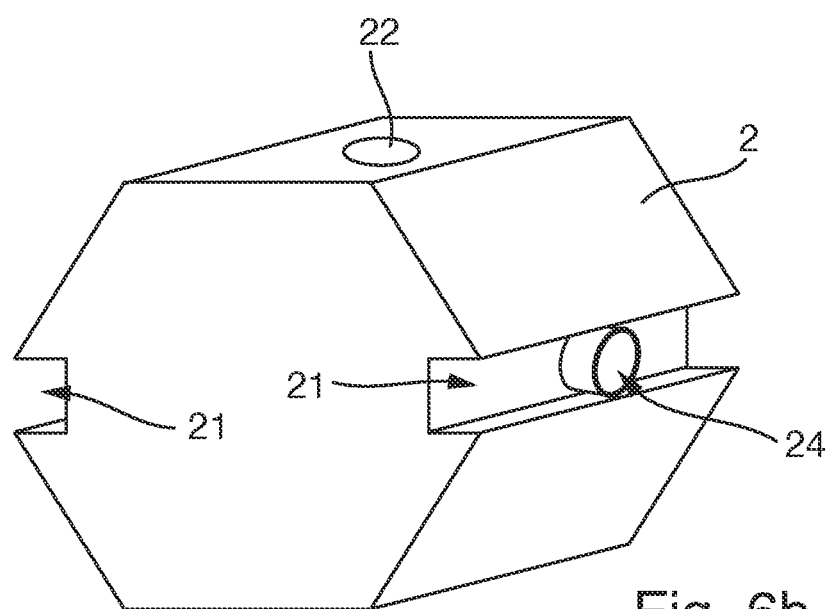
FIG. 6b shows a schematic perspective view of a slot nut with a spring ball.

FIGS. 6a and 6b show two possible variants of a slot nut 2 with additional fixing means corresponding to the second embodiment of the present disclosure. In both cases, the additional fixing means are attached in the middle of the at least one groove 21 of the slot nut 2 in order to engage with the gap 14 of the flange 12 and hence additionally fixate the slot nut 2 in lateral direction.

FIG. 6a shows a schematic perspective view of a slot nut 2 with a spring leaf 23. The width of the spring leaf 23 is in some embodiments less than the width of the gap 14, so that the spring leaf 23 can extend into the gap 14 and push against the side wall 1B of the slot nut 2.

FIG. 6b shows a schematic perspective view of a slot nut 2 with a spring ball 24. The diameter of the spring ball 24 is in certain embodiments less than the width of the gap 14, to enable the spring ball 24 to extend into the gap 14 and push against the side wall 1B of the slot nut 2.

Figure 7:
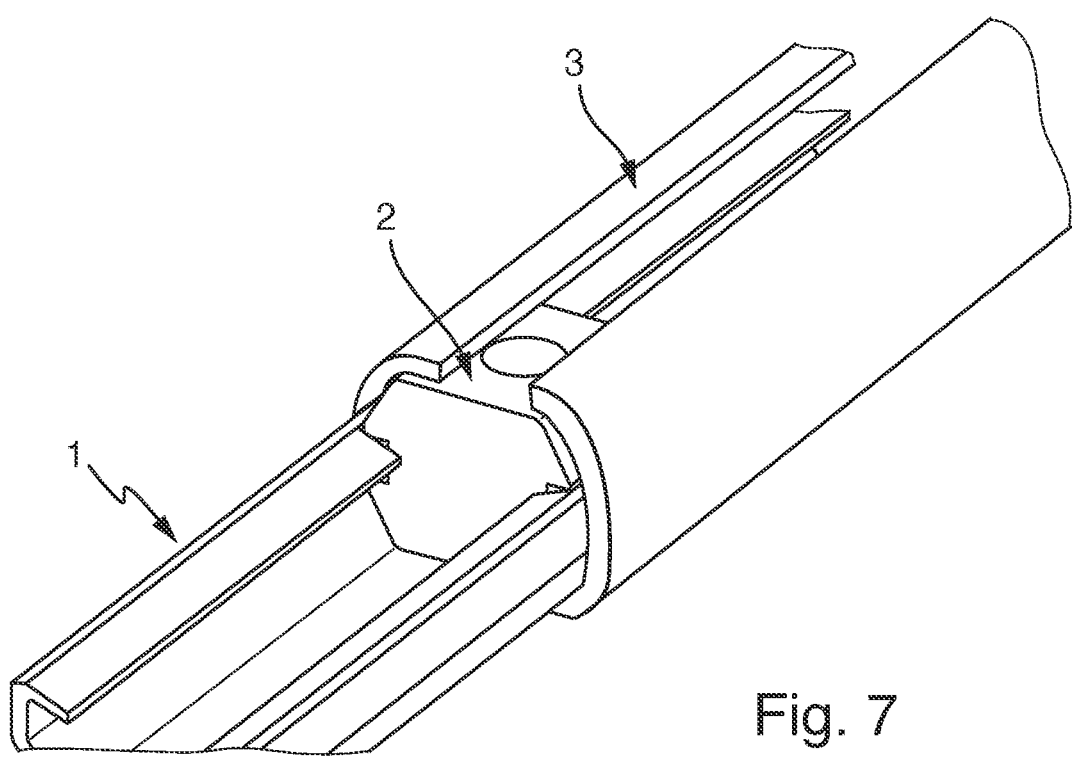
FIG. 7 shows schematic view of a fixing system to be inserted into a slot profile.

FIG. 7 schematically shows the fixing system 10 to be inserted into the slot profile 3. The positioning unit 1 with the pre-positioned slot nuts 2, which are fixed here in the slots 11, is slidably inserted into the slot profile 3. The positioning unit 1 of the fixing system 10 may correspond to the above described positioning unit 1 of the first or of the second embodiment. As soon as the fixing system 10 is fully inserted into the slot profile 3, the slot nuts 2 are situated at their predetermined positions such that any components can be fixed to the slot nuts 2. By fixing components to the slot nuts 2, the slot nuts 2 are tensioned in a direction perpendicular to the length of the slot profile 3 such that the positioning unit 1 does not serve any purpose anymore. The resulting connection solely relies on the strength of the connection between the slot nuts 2 and the slot profile 3 after the slot nuts 2 are screwed into the slot profile 3 by bolts.

Slot profile 3 may be made as an aluminum extrusion profile. The slot profile 3 may be U-formed as shown in FIG. 7, or may be provided as a channel as discussed in the following according to FIGS. 8 and 9.

Figure 8:
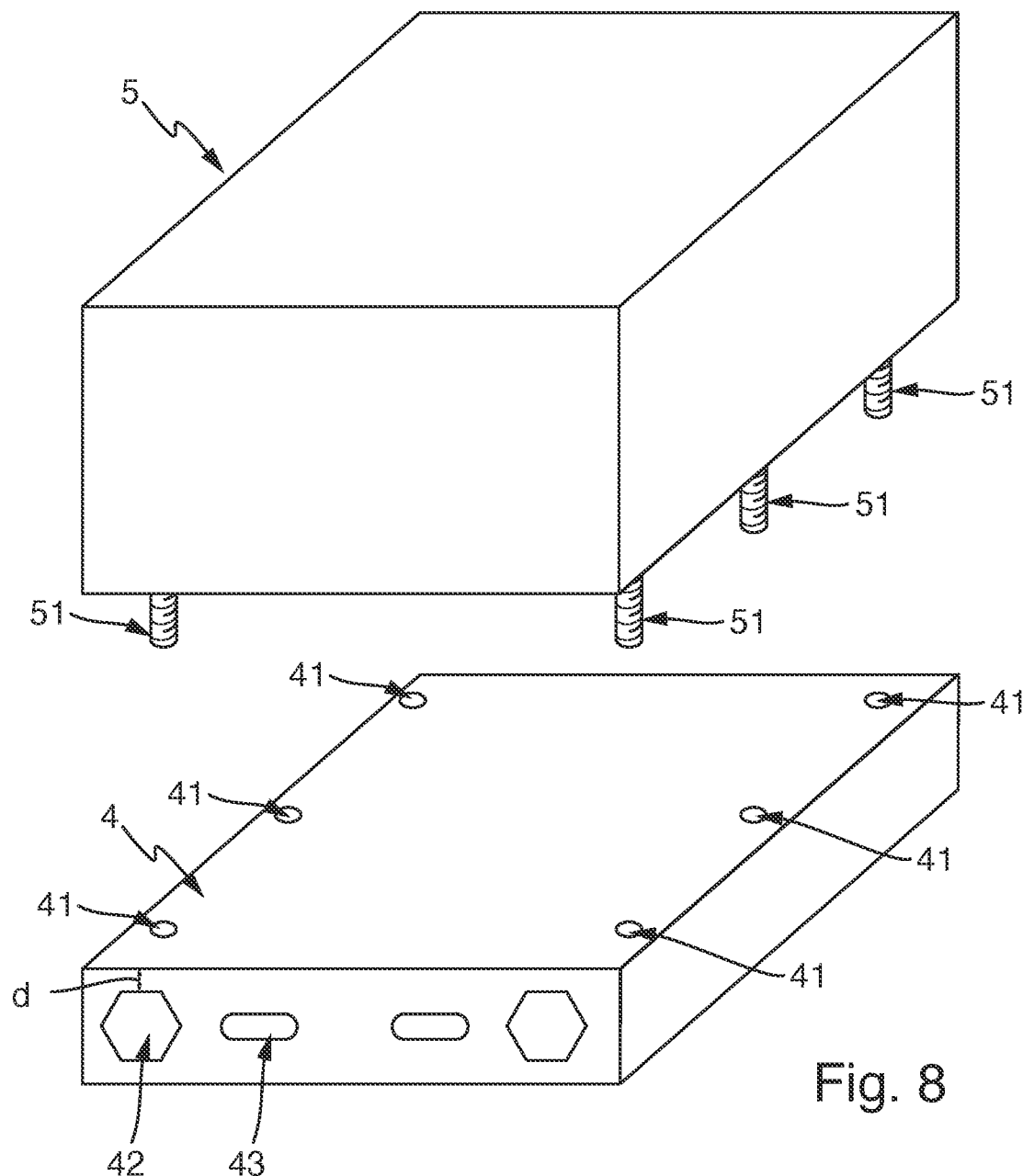
FIG. 8 shows a schematic view of a battery module and a battery bottom plate to be assembled.
Figure 9:
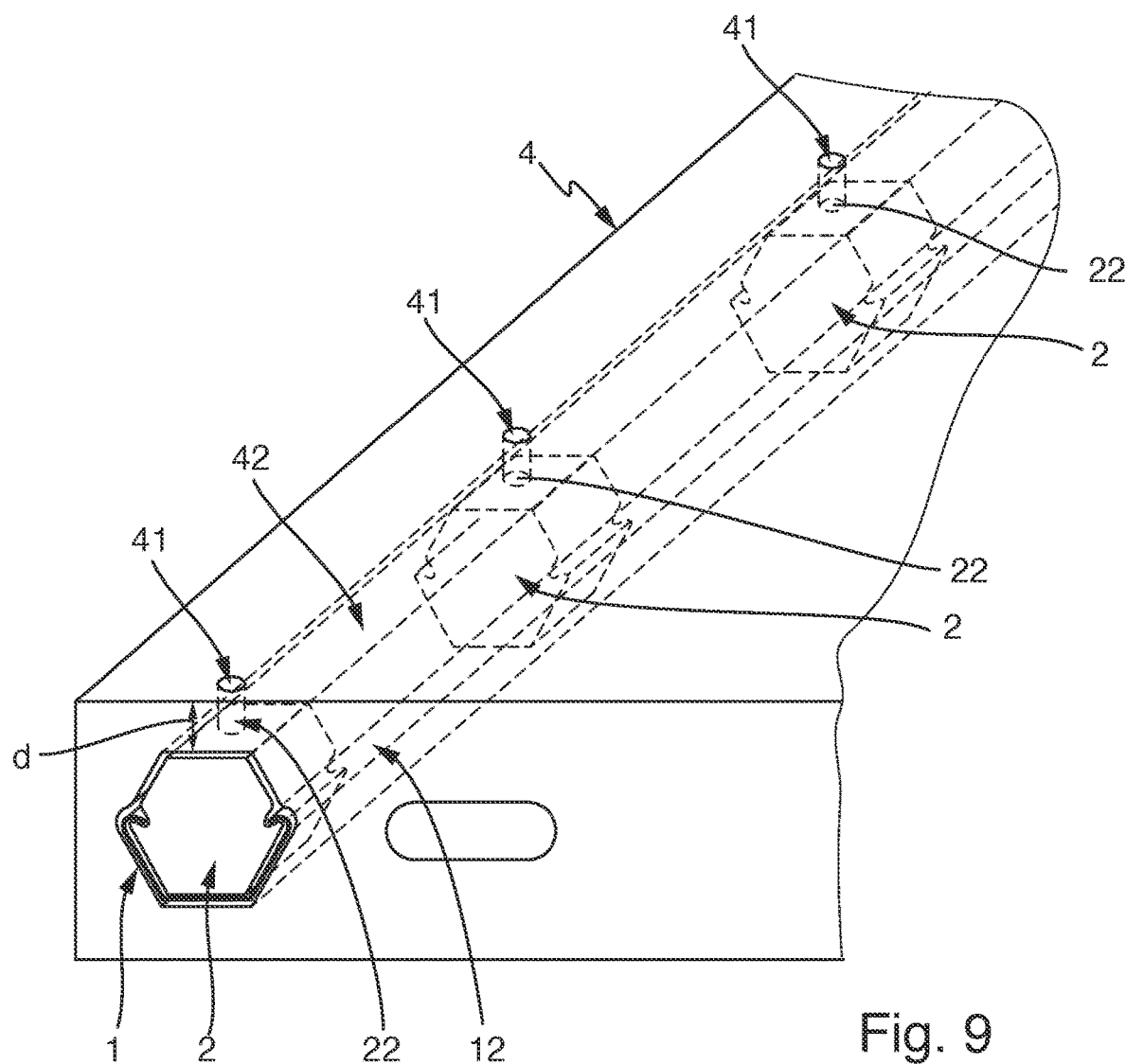
FIG. 9 shows a schematic semi-transparent view of a part of a battery bottom plate with an inserted fixing system.

FIGS. 8 and 9 show an exemplary embodiment for the assembly of a traction battery for a vehicle.

FIG. 8 shows a bottom plate 4 of a battery housing and a battery module 5 which is to be attached to the bottom plate 4. The bottom plate 4 has two fixing channels 42 which have a hexagonal shape and two temperature control channels 43.

Through the temperature control channels 43 a temperature control fluid such as heated or cooled water may flow in order to increase or reduce the temperature of the bottom plate 4 in order to heat or cool components in thermal connection with the bottom plate 4. In particular, in this manner the temperature of the battery module 5 positioned on the bottom plate 4 may be increased or reduced in order to keep the battery module 5 in a certain temperature range.

The shape of the fixing channels 42 corresponds to the shape of the fixing system 10. Along the fixing channel 42 in the present embodiment three drill holes 41 are provided, the depth d of which corresponds to the distance between the top surface of the fixing channel 42 and the top surface of the battery bottom plate 4. The position of the drill holes 41 corresponds to the respective position of the bolt or screw which is to be used to fixate the battery module 5 to the bottom plate 4.

Fixing channels 42 are implemented for the insertion of the fixing system 10. The pre-assembled fixing system 10 has three slot nuts 2 already pre-positioned at positions along the positioning unit 1, such that once the fixing system 10 is fully inserted into the fixing channel 42, the threaded holes 22 of the inserted slot nuts 2 perfectly coincide with the drill holes 41 of the bottom plate 4 along the corresponding fixing channel 42. After fixing systems 10 are inserted into both fixing channels 42, bolts 51 of the battery module 5 placed on the battery bottom plate 4 can pass through the corresponding drill holes 41 and can subsequently be screwed into the threaded holes 22 of the slot nuts 2.

FIG. 9 is a transparent view of a part of the battery bottom plate 4 with the fixing system 10 being inserted into the fixing channel 42. The positioning unit 1 with three slot nuts 2 placed along the positioning unit 1 is seen on FIG. 9. The first and the third slot nut 2 are placed at the very ends of the fixing channel 42, while the second slot nut 2 is placed in the middle of the channel. Of course it is very easy to adapt the positions of the slot nuts 2 to any desirable order and number inside the channel if the length of the channel is enabled. In some embodiments, the length of the positioning unit 1 is the same as the length of the fixing channel 42, to make absolute positioning of the slot nuts 2 inside the fixing channel 42 easier. Since if slot nuts 2 are positioned at predetermined distances along the positioning unit 1 that correspond to the distances between the drill holes 41 along the fixing channel 42, the drill holes 41 and the threaded holes 22 coincide automatically, once the fixing system 10 is fully inserted into the fixing channel 42.

Figure 10A:
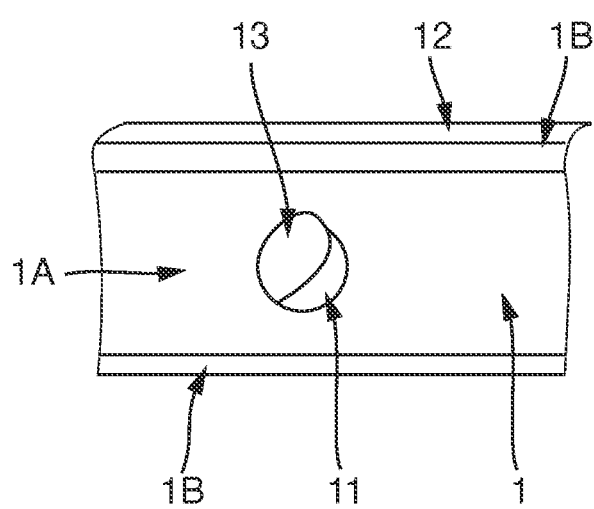
FIG. 10a shows a schematic top view of a slot of the positioning unit with a tongue.
Figure 10B:
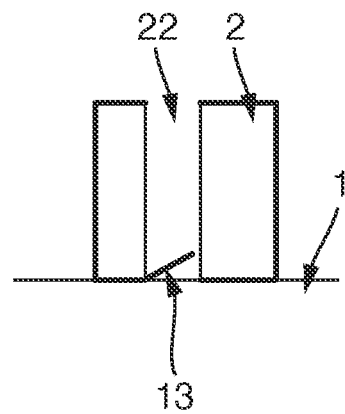
FIG. 10b shows a schematic vertical cross section view of a slot with a tongue and with an inserted slot nut.

In FIGS. 10a and 10b one possible implementation of a fixing means for fixing of a slot nut 2 at a corresponding slot 11 along the positioning unit 1 is schematically shown. FIG. 10a shows a top view of the slot 11 of the positioning unit 1 with a flexible tongue 13. The tongue 13 protrudes in vertical direction, away from the bottom plate 1A. The tongue 13 may be bent down, when a force from above is applied, until it reaches a position parallel with the bottom plate 1A. The slot nut 2 can hence slide over the tongue 13 in one direction, but not in the other one. To fix the slot nut 2, at the desired position marked by a slot 11, it has to be slid over the tongue 13 of the corresponding slot 11, such that the tongue 13 slides into the threaded hole 22 of the slot nut 2 from below, as depicted in FIG. 10b.

FIG. 10b is a vertical cross section view of the slot 11 with the tongue 13 and with the inserted and fixed slot nut 2. If the slot nut 2 has to reach another position further down along the positioning unit 1, it has to be pushed further, across the tongue 13, till it reaches the furthermost empty tongue 13. In this way, slot nuts 2 are inserted and fixed one by one into the positioning unit 1.

Of course, the fixing means for the slot nut 2 may also be part of a slot nut 2 instead of the positioning unit 1. Slot nuts 2 with ball springs are well known in the art and would be especially adequate for the above described system, since the ball with the spring may nicely fix the slot nut 2 into the slot 11 of the positioning unit 1. Advantageously such slot nuts 2 may also be removed from the positioning unit 1 in any direction. Other possibilities of fixing slot nuts 2 in the slot profile 3 are known in the art and may also be adapted for fixing the slot nuts into the positioning unit 1, e.g. slot nuts with a flex handle, spring leafs or a set screw.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

The invention claimed is:

1. A fixing system for fixing battery components in a battery housing, comprising:
   a positioning unit; and
   one or more slot nuts,
wherein the positioning unit is configured to receive the one or more slot nuts at predetermined positions along the positioning unit, and the positioning unit including the one or more slot nuts is insertable into a slot profile of the battery housing.

2. The fixing system of claim 1, wherein at least one slot nut from the one or more slot nuts is configured for mounting battery components in the battery housing.

3. The fixing system of claim 2, wherein the at least one slot nut comprises at least one threaded hole configured to receive a screw or a bolt.

4. The fixing system of claim 1, wherein the positioning unit is configured to fix at least one slot nut from the one or more slot nuts at a predetermined position along a length of the positioning unit at least with respect to a first movement direction.

5. The fixing system of claim 4, wherein the positioning unit comprises one or more slots configured to fix the at least one slot nut at the predetermined position along the length of the positioning unit.

6. The fixing system of claim 5, wherein the positioning unit further comprises a flexible tongue attached at each slot of the one or more slots, and the flexible tongue is configured to fix a slot nut at its corresponding slot.

7. The fixing system of claim 1, wherein the positioning unit comprises an extruded profile.

8. The fixing system of claim 1, wherein the positioning unit comprises a plastic.

9. The fixing system of claim 8, wherein the plastic comprises an extruded plastic.

10. The fixing system of claim 1, wherein the one or more slot nuts comprise one or more slide-in slot nuts or one or more roll-in slot nuts.

11. The fixing system of claim 1, wherein the one or more slot nuts are shaped as hexagonal prisms, the one or more slot nuts are widest in a middle portion of the one or more slot nuts, and the one or more slot nuts comprise grooves along two opposite sides of the one or more slot nuts.

12. The fixing system of claim 11, wherein the grooves run along the middle portion of the one or more slot nuts.

13. The fixing system of claim 11, wherein the positioning unit comprises two flanges along its length, and the one or more slot nuts are slidably insertable in the positioning unit such that the two flanges run in the grooves of the one or more slot nuts.

14. The fixing system of claim 11, wherein the one or more slot nuts comprise a fixing means arranged in at least one of the grooves, and the fixing means is configured to fix the one or more slot nuts in a lateral direction.

15. The fixing system of claim 14, wherein the fixing means comprises a spring leaf or a ball spring.

16. The fixing system of claim 1, wherein:
the positioning unit comprises two flanges along its length,
the two flanges comprise gaps at predetermined positions along the positioning unit to enable the one or more slot nuts to be pressed into the positioning unit, and
for each slot nut of the one or more slot nuts, positions of a threaded hole, a slot of the positioning unit that is configured to fix a slot nut at a predetermined position along a length of the positioning unit, and the gaps on the two flanges correlate.

17. The fixing system of claim 16, wherein an elastic portion of each flange of the two flanges is defined between two gaps of each flange, and the elastic portion is configured to receive a slot nut from the one or more slot nuts.

18. The fixing system of claim 1, wherein the one or more slot nuts comprise a fixing means configured to fix the one or more slot nuts in the positioning unit.

19. The fixing system of claim 18, wherein the fixing means comprise a set screw, a flex handle, a ball spring, or a spring leaf.

* * * * *